(12) United States Patent
Li et al.

(10) Patent No.: US 9,740,355 B2
(45) Date of Patent: Aug. 22, 2017

(54) SELF-CAPACITIVE TOUCH DISPLAY PANEL, ARRAY SUBSTRATE THEREFOR AND TOUCH DEVICE

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN); Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 78 days.

(21) Appl. No.: 15/003,615

(22) Filed: Jan. 21, 2016

(65) Prior Publication Data

US 2016/0291726 A1 Oct. 6, 2016

(30) Foreign Application Priority Data

Apr. 1, 2015 (CN) .......................... 2015 1 0153182

(51) Int. Cl.
*G06F 3/044* (2006.01)
*G06F 3/041* (2006.01)
*G02F 1/1333* (2006.01)
*G02F 1/1362* (2006.01)

(52) U.S. Cl.
CPC ............ *G06F 3/044* (2013.01); *G06F 3/0412* (2013.01); *G02F 1/13338* (2013.01); *G02F 1/136286* (2013.01)

(58) Field of Classification Search
CPC .... G06F 3/044; G06F 3/0412; G02F 1/13338; G02F 1/136286
USPC ........... 178/18.01–19.07; 345/104, 173–178; 349/12
See application file for complete search history.

(56) References Cited

U.S. PATENT DOCUMENTS

2009/0289912 A1 11/2009 Chen et al.

*Primary Examiner* — Michael Pervan
(74) *Attorney, Agent, or Firm* — Alston & Bird LLP (57) ABSTRACT

A self-capacitive touch display panel, an array substrate therefor and a touch device are provided. The array substrate includes: a substrate; gate lines, data lines, and pixel units each including a pixel electrode and a pixel thin film transistor; multiple touch-driven thin film transistors each having a gate connected to one gate line and a first electrode connected to one data line; a common electrode layer including multiple touch display electrodes each electrically connected to second electrodes of at least two touch-driven thin film transistors connected to different gate lines; and a data line gating circuit controlling a specified data line to provide a specified pixel unit with a display data signal in a display stage and provide a specified pixel unit with a touch detection data signal in a touch stage.

15 Claims, 4 Drawing Sheets

Figure 1

PRIOR ART

Figure 2

PRIOR ART

SELF-CAPACITIVE TOUCH DISPLAY PANEL, ARRAY SUBSTRATE THEREFOR AND TOUCH DEVICE

CROSS REFERENCE OF RELATED APPLICATION

The present application claims the priority to Chinese Patent Application No. 201510153182.0, entitled "SELF-CAPACITIVE TOUCH DISPLAY PANEL, ARRAY SUBSTRATE THEREFOR AND TOUCH DEVICE", filed on Apr. 1, 2015 with the State Intellectual Property Office of the People's Republic of China, which is incorporated herein by reference in its entirety.

TECHNICAL FIELD OF THE INVENTION

The disclosure relates to the field of touch display technologies, in particular, to a self-capacitive touch display panel, an array substrate for the self-capacitive touch display panel and a touch device.

BACKGROUND OF THE INVENTION

At early phases of development of touch display technologies, a touch display panel was formed by attaching a touch panel on a display panel, to achieve a touch display function. The touch panel and the display panel needed to be manufactured separately, thereby resulting in high cost, a large thickness and low productivity.

With the development of self-capacitive touch display technology, a common electrode of an array substrate in the display panel may double as touch sensing electrodes for self-capacitive touch detection. In self-capacitive touch control display devices, display control is performed in a time-division manner by means of a driving in a time-division mode, and thus implementing both the touch function and the display function. In this case, the touch sensing electrodes are integrated within the display panel thereby reducing the fabrication cost greatly, improving productivity, and reducing the thickness of the panel.

In the case that touch detection is performed using the common electrode, the common electrode layer needs to be divided into multiple common touch display electrodes. In order to achieve touch control and display control in a time-division manner, a voltage signal is provided for each of the common touch display electrodes via one separate wire. By means of the wires, a touch sensing signal is provided for respective common touch display electrodes in a touch stage, and a display driving voltage is provided for respective common touch display electrodes in a display stage.

For the existing self-capacitive touch display plane, a metal layer generally needs to be deposited separately, and wires for the touch display electrodes are manufactured by means of the metal layer. In this case, the self-capacitive touch display plane has disadvantages of complex fabrication process, high cost, and a large thickness of the panel due to a separate wire layer.

SUMMARY OF THE INVENTION

In order to solve the above technical issues, a self-capacitive touch display panel, an array substrate for the self-capacitive touch display panel and a touch device are provided according to embodiments of the disclosure to simplify the fabrication process for the self-capacitive touch display panel and reduce the cost and the thickness of the panel.

Technical solutions as follows are provided in the disclosure.

An array substrate for a self-capacitive touch display panel is provided. The array substrate includes a substrate, multiple gate lines and multiple data lines, a pixel unit, multiple touch-driven thin film transistors, a common electrode layer and a data line gating circuit. The substrate includes a display area and a border area. The gate lines are insulated from and intersect with the data lines to define multiple pixel units arranged in an array. Each pixel unit includes: a pixel electrode; and a pixel thin film transistor, where a gate of the pixel thin film transistor is connected to one of the gate lines, a first electrode of the pixel thin film transistor is connected to one of the data lines, and a second electrode of the pixel thin film transistor is connected to the pixel electrode. The touch-driven thin film transistors are disposed in a same layer as the pixel thin film transistors, a gate of each of the touch-driven thin film transistors is connected to one of the gate lines, and a first electrode of each of the touch-driven thin film transistors is connected to one of the data lines. The common electrode layer is disposed in the display area, where the common electrode layer includes multiple touch display electrodes insulated from each other, each of the touch display electrodes is electrically connected to second electrodes of at least two of the touch-driven thin film transistors connected to different gate lines, and the touch-driven thin film transistors and the pixel thin film transistors connected to the same gate line have different on-state voltages. The data line gating circuit disposed in the border area, where the data line gating circuit is used to control the data lines to provide the pixel electrodes with display data signals in a display stage, provide the touch display electrodes with common voltage signals in the display stage, and provide the touch display electrodes with touch detection data signals in a touch stage.

A self-capacitive touch display panel is further provided according to the disclosure. The self-capacitive touch display panel includes: an array substrate and a color film substrate disposed opposite to the array substrate, where the array substrate is the array substrate described above; a liquid crystal layer disposed between the array substrate and the color film substrate; and a driving chip disposed in the border area on the array substrate, where the driving chip is electrically connected to the data line gating circuit of the array substrate.

A touch device is further provided according to the disclosure. The touch device includes the above self-capacitive touch display panel.

It can be seen from the above description that, the common electrode layer of the array substrate according to the embodiments of the disclosure is divided into multiple touch display electrodes, to perform self-capacitive touch detection. Data lines of the pixel units of the array substrate further serve as wires for the touch display electrodes. A common voltage signal, a display data signal and a touch detection data signal may be provided for the respective touch display electrodes in a time-division manner by means of the data line gating circuit. In this case, it is not necessary to deposit a metal layer separately for manufacturing the wirings of the touch display electrodes, thereby simplifying the fabrication process and reducing the fabrication cost and the thickness of the panel.

BRIEF DESCRIPTION OF THE DRAWINGS

In order to illustrate technical solutions according to embodiments of the disclosure more clearly, the drawings to be used in the description of the embodiments are described briefly hereinafter. The drawings described hereinafter are only for some embodiments of the present disclosure, and other drawings may be obtained by those skilled in the art according to those drawings without creative effort.

DETAILED DESCRIPTION OF EMBODIMENTS

Hereinafter, technical solutions in embodiments of the disclosure are described clearly and completely in conjunction with the drawings of the embodiments of the disclosure. It is apparent that the described embodiments are only a part of embodiments of the present application. Other embodiments obtained by those skilled in the art on the basis of the embodiments of the present disclosure without creative work fall into the scope of protection of the present disclosure.

Figure 1:
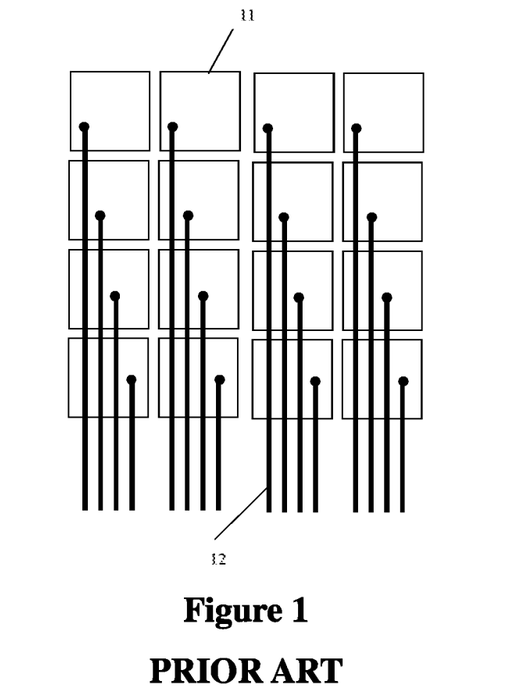
FIG. 1 is a top view of an array substrate according to conventional technology.

As shown in FIG. 1, the array substrate includes a common electrode layer and a wiring layer correspondingly disposed above a substrate. The common electrode layer is divided into multiple touch display electrodes 11, and the wiring layer includes multiple wires 12, where there is a one-to-one correspondence between the wires and the touch display electrodes 11. The array substrate further includes multiple pixel units, multiple gate lines and multiple data lines. Each pixel unit includes a pixel electrode and a pixel thin film transistor. The multiple pixel units, multiple gate lines and multiple data lines are not shown in FIG. 1.

Figure 2:
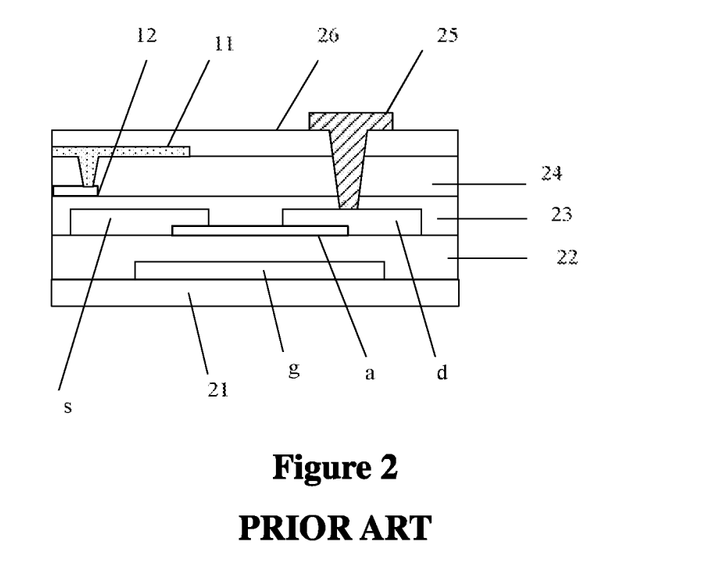
FIG. 2 is a schematic diagram showing relationships among layers of an array substrate according to conventional technology.

Reference is now made to FIG. 2, which is a schematic diagram of relationships among layers of an array substrate. A pixel thin film transistor, a gate line and a data line are disposed on one side of a substrate 21. A gate g of the pixel thin film transistor is disposed on a surface of the substrate 21, and the gate line (not shown in FIG. 2) is disposed in the same layer with the gate g. A gate insulation layer 22 is disposed on surfaces of the gate line and the gate g, the surface of substrate 21. An active region a, and a drain d and a source s connected to the active region are disposed on a surface of the gate insulation layer 22. The data line (not shown in FIG. 2) is electrically connected to the source s, and the data line may be disposed in the same layer with the source s, or the data line may be disposed in a different layer from the source s. A first insulation layer 23 is disposed covering the source s, the drain d and the active region a. A wiring layer including multiple wires 12 is disposed on a surface of the first insulation layer 23. A second insulation layer 24 is disposed on a surface of the wiring layer. A common electrode layer is disposed on a surface of the second insulation layer 24. The common electrode layer includes multiple touch display electrodes 11 electrically connected to the wires respectively. A third insulation layer 26 is disposed on a surface of the common electrode layer; and a pixel electrode 25 is disposed on a surface of the third insulation layer 26.

The touch display electrodes 11 are electrically connected to the wires 12 respectively through via holes, and the pixel electrode 25 is electrically connected to the drain d of the pixel thin film transistor in the pixel unit where the pixel electrode 25 locates through a via hole.

It can be seen from the above description that, in the case that touch detection is performed using the common electrode layer, a wiring layer needs to be deposited separately. By means of the wiring layer, each of the touch display electrodes is connected to one of the wires separately, which results in a complex fabrication process, high cost, and a large thickness of the panel.

In order to solve the above technical issues, an array substrate is provided according to an embodiment of the disclosure, which may be applied to a self-capacitive touch display panel.

Figure 3:
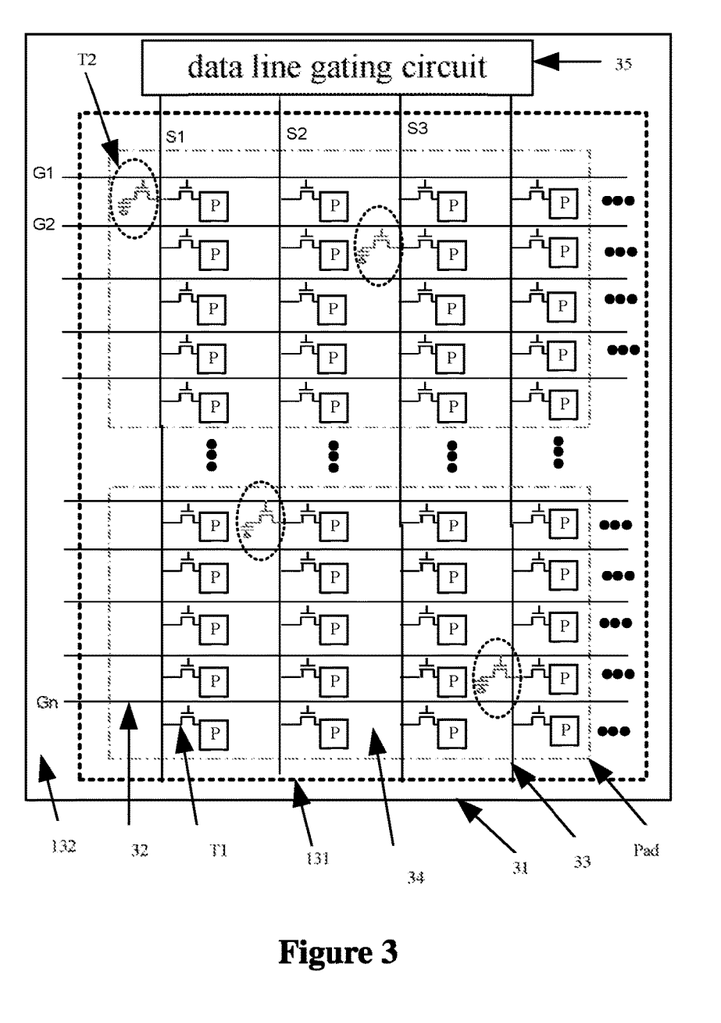
FIG. 3 is a schematic structural diagram of an array substrate according to an embodiment of the disclosure.

Reference is now made to FIG. 3, which is a schematic structural diagram of an array substrate according to an embodiment of the disclosure. The array substrate includes: a substrate 31 including a display area 131 and a border area 132; multiple gate lines 32 and multiple data lines 33 disposed in the display area 131, where the gate lines 32 are insulated from and intersect with the data lines 33 to define multiple pixel units 34 arranged in an array; multiple touch-driven thin film transistors T2; a common electrode layer disposed in the display area 131; and a data line gating circuit 35 disposed in the border area.

Each of the pixel units 34 includes: a pixel electrode P and a pixel thin film transistor T1. A gate of the pixel thin film transistor T1 is connected to one of the gate lines 32, a first electrode of the pixel thin film transistor T1 is connected to one of the data lines 33, and a second electrode of the pixel thin film transistor T1 is connected to the pixel electrode P. In one embodiment of the disclosure, one of the first electrode and the second electrode is a drain and the other is a source, for example, the first electrode is a source and the second electrode is a drain.

The touch-driven thin film transistors T2 are disposed in the same layer with the pixel thin film transistors T1. A gate of one touch-driven thin film transistor T2 is connected to one of the gate lines 32, and a first electrode of the touch-driven thin film transistor T2 is connected to one of the data lines 33. The common electrode layer includes multiple touch display electrodes Pad insulated from each other. Each of the touch display electrodes Pad is electrically connected to second electrodes of at least two of the touch-driven thin film transistors T2 connected to different gate lines 32. Different on-state voltages are provided for the touch-driven thin film transistors T2 and the pixel thin film transistors T1 connected to a same gate line 32 when the gate line 32 is scanned. By inputting different scanning signals to one gate line 32, the pixel thin film transistors T1 connected to the gate line are controlled to be turned on and the touch-driven thin film transistors T2 connected to the gate line are controlled to be turned off; or the pixel thin film transistors T1 connected to the gate line are controlled to be turned off and the touch-driven thin film transistors T2 connected to the gate line are controlled to be turned on; or both of the pixel thin film transistors T1 and the touch-driven thin film transistors T2 connected to the gate line are controlled to be turned off.

Each of the touch display electrodes Pad includes at least two touch-driven thin film transistors T2. The gates of the two touch-driven thin film transistors T2 are connected to different gate lines 32, and the second electrodes of the two touch-driven thin film transistors T2 are connected to the corresponding touch display electrode Pad.

The data line gating circuit 35 controls the data lines 33 to provide specified pixel electrodes P with a display data signal in a display stage, provide the touch display electrodes Pad with a common voltage signal in the display stage, and provide the touch display electrodes Pad with a touch detection data signal in a touch stage.

In the display stage, the gate lines 32 are scanned one by one, and the display data signal is provided for the pixel electrodes P via the data lines 33. When charging the pixel electrodes P, at least one of the touch-driven thin film transistors T2 may be turned on via the gate line 32 which is not currently scanned, and the common voltage signal is provided for the touch display electrode Pad corresponding to the turned on touch-driven thin film transistor T2 via the data line 33 electrically connected to the turned on touch-driven thin film transistor T2, and thus the display is performed. In the touch stage, the gate lines are not needed to be scanned, and the common voltage signal and the display data signal are not needed to be transmitted via the data lines 33. Therefore, at least one of the touch-driven thin film transistors T2 may be turned on via the gate line 32, and the touch detection data signal is provided for the touch display electrode Pad corresponding to the turned on touch-driven thin film transistor T2 via the data line 33 electrically connected to the turned on touch-driven thin film transistor T2. In the case that any one of the gate lines 32 is scanned, the touch-driven thin film transistors T2 connected to the gate line 32 are turned off and the pixel thin film transistors T1 connected to the gate line 32 are turned on.

For the same touch display electrode Pad, the data lines 33 connected to the turned on touch-driven thin film transistors T2 provide the touch display electrode Pad with the display data signal, the touch detection data signal or the common voltage signal via the touch-driven thin film transistors T2, in the case that multiple touch-driven thin film transistors T2 are turned on. Signal input operations are performed synchronously for different data lines 33.

In the embodiment of the disclosure, different on-state voltages are provided for the touch-driven thin film transistors T2 and the pixel thin film transistors T1 connected to the same gate line 32 when the gate line 32 is scanned, to control the display stage and the touch stage in a time-division manner. To ensure that different on-state voltages are provided for the touch-driven thin film transistors T2 and the pixel thin film transistors T1 connected to the same gate line 32 when the gate line 32 is scanned, the pixel thin film transistors T1 may be PMOS transistors and the touch-driven thin film transistors T2 may be NMOS transistors. In other embodiments, the pixel thin film transistors T1 may be NMOS transistors and the touch-driven thin film transistors T2 may be PMOS transistors. In the case that a voltage signal input to the gate line 32 is greater than a threshold voltage of the NMOS transistors, the NMOS transistors are turned on and the PMOS transistors are turned off. In the case that the voltage signal input to the gate line 32 is less than a threshold voltage of the PMOS transistors, the NMOS transistors are turned off and the PMOS transistors are turned on; or in the case that the voltage signal input to the gate line 32 ranges from the threshold voltage of the NMOS transistors to the threshold voltage of the PMOS transistors, both of the NMOS transistors and the PMOS transistors are turned off.

In FIG. 3, at least two of the touch-driven thin film transistors T2 are disposed on a substrate area corresponding to one touch display electrode Pad. The at least two of the touch-driven thin film transistors T2 are connected to different data lines 33 and different gate lines 32 in the touch display electrode Pad. The touch-driven thin film transistors T2 connected to the same data line 33 are electrically connected to the same touch display electrode Pad. For example, the touch-driven thin film transistors T2 connected to the data line S1 are electrically connected to the upper touch display electrode Pad as shown in FIG. 3.

In the embodiment of the array substrate shown in FIG. 3, in the case that the scan is performed in the display stage, all gate lines on the array substrate may be scanned from a first gate line G1 to a last gate line Gn (a forward scan), or may be scanned from the last gate line Gn to the first gate line G1 (a reverse scan); or other ways of progressive scan may be adopted.

For any one of the touch display electrodes Pad, in the case that a certain gate line 32 is scanned and a display data signal is input via a data line 33 corresponding to the gate line 32 at any time, a control signal for turning on a touch-driven thin film transistor T2 may be provided for a gate line 32, which is not currently scanned, corresponding to the touch display electrode Pad, to turn on the touch-driven thin film transistor T2. A common voltage signal may be provided for the touch display electrode Pad via the data line 33 connected to the turned on touch-driven thin film transistor T2.

In the present disclosure, each of the touch display electrodes Pad is connected to the second electrodes of at least two touch-driven thin film transistors T2, the gates of the two touch-driven thin film transistors T2 are connected to different gate lines 32, and the sources of the two touch-driven thin film transistors T2 are connected to different data lines 33. In an embodiment shown in FIG. 3, two touch-driven thin film transistors T2 are disposed within each of the touch display electrodes Pad.

In FIG. 3, the pixel thin film transistors T1 connected to a first gate line G1 are all turned on and the touch-driven thin film transistors T2 connected to the first gate line G1 are all turned off, when the first gate line G1 is being scanned. In this case, a display data signal is input to the first data line S1, the pixel electrode P in the first row from the upper and the first column from the left is charged, and a common voltage signal is provided for a third data line S3. After the display data signal is input to the first data line S1, another display data signal is input to a second data line S2, the pixel electrode P in the first row and the second column is charged, and the common voltage signal is provided for the third data line S3, to implement the display of a pixel unit 34 corresponding to the pixel electrode P in the first row and the second column.

After the display data signal is input to the first data line S2, the first gate line G1 is off, and a second gate line G2 is scanned. In this case, further another display data signal is provided for the third data line S3, the pixel electrode P in the first row and the third column is charged, and the common voltage signal is provided for the first data line S1.

As described above, the common voltage signal needs to be provided for the touch display electrode Pad via the touch-driven thin film transistor connected to the third data line S3, to charge the pixel electrode P in the first row and the first column. The common voltage signal is input to the third data line S3, the pixel thin film transistors T1 connected to the first gate line G1 are all turned on; hence, the pixel electrode P in the first row and the third column is charged due to the common voltage signal being input to the third data line S3, and thus affecting the display of a pixel unit 34 corresponding to the pixel electrode P. To avoid the above technical issue and to ensure better display quality, in one touch display electrode Pad, parts of the pixel units 34 connected to the same data line 33 with the touch-driven thin film transistor T2 are located in the border area 132 or are white pixel units. In the embodiment as shown in FIG. 3, the pixel unit corresponding to the pixel electrode in the first row and the third column may be arranged in the border area 132 or may be set as a white pixel unit.

In the touch stage, since the gate lines are not needed to be scanned, a control signal for turning on a touch-driven thin film transistor T2 may be provided for a gate line 32 corresponding to any touch display electrode Pad, to turn on the touch-driven thin film transistor T2. A touch detection data signal may be provided for the touch display electrode Pad via a data line 33 connected to the turned on touch-driven thin film transistor T2.

In FIG. 3, each of the touch display electrode Pad corresponds to four data lines 33 and five gate lines 32. For ease of illustration, only one column of touch display electrodes Pad are shown. The number of rows of the touch display electrodes Pad and the number of the touch display electrodes Pad, and the number of gate lines 32, data lines 33 and pixel electrodes P corresponding to one touch display electrode Pad are not limited, and may be set according to the size of the panel.

In the array substrate according to the disclosure, the common electrode layer may disposed between the pixel electrodes P and the substrate 31; or the pixel electrodes P may be disposed between the common electrode layer and the substrate 31.

In order to ensure an aperture ratio of each pixel unit 34 and to ensure each pixel unit 34 with a good light transmission rate, the touch-driven thin film transistors T2 and the pixel thin film transistors T1 connected to the same data line 33 are disposed on two sides of the data line 33 respectively, and no more than one of the touch-driven thin film transistors T2 is disposed in one pixel unit 34.

The second electrodes of the touch-driven thin film transistors connected to the same data line are electrically connected to the same touch display electrode. In this case, a touch detection data signal is provided for only one touch display electrode Pad via a specified data line 33, so as to implement a touch detection operation.

It can be seen from the above description that, the common electrode layer of the array substrate according to the embodiments of the disclosure is divided into multiple touch display electrodes Pad, to perform self-capacitive touch detection. The data lines of the pixel units 34 in the array substrate further serve as wires for the touch display electrodes Pad, to provide the touch display electrodes Pad with common voltage signals or touch detection data signals. In this case, it is not necessary to deposit a metal layer separately for manufacturing the wires for the touch display electrodes Pad, thereby simplifying the fabrication process and reducing the fabrication cost and reducing the thickness of the panel.

In one embodiment of the disclosure, the data line gating circuit 35 includes: multiple gating units, and each of the gating units includes multiple clock signal terminals, at least one output terminal, a first input terminal, and a second input terminal. One of the clock signal terminals is connected to one corresponding clock signal line. At least one output terminal is connected to one corresponding data line and the first input terminal is connected to a touch display data signal line. The touch display data signal line is for providing the display data signal and the touch detection data signal, and the second input terminal is connected to a common voltage signal line, and the common voltage signal line is for providing the common voltage signal. Each of the gating units includes one first input terminal and one second input terminal.

Figure 4:
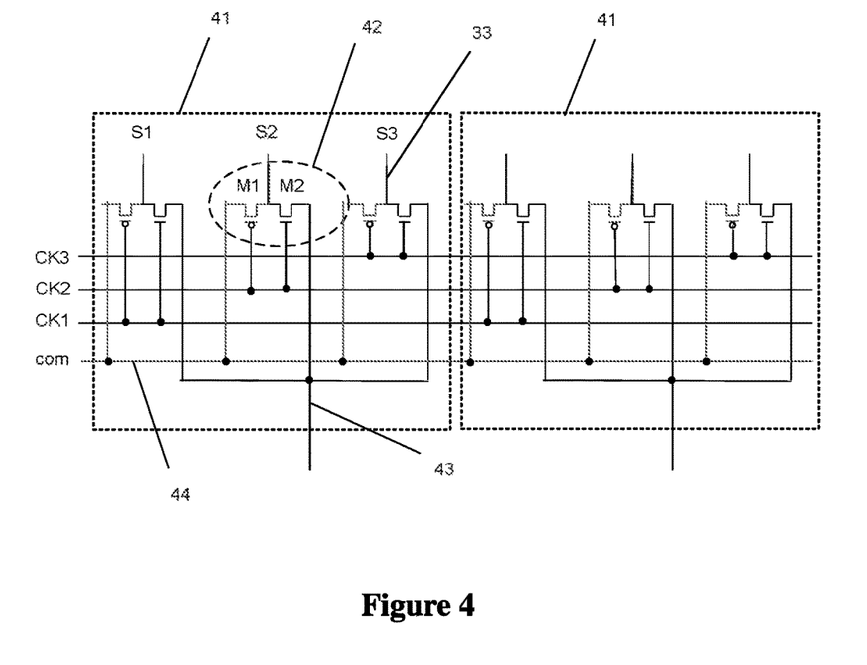
FIG. 4 is a schematic structural diagram of a data line gating circuit according to an embodiment of the disclosure.

Now with reference to FIG. 4, which is a schematic structural diagram of a data line gating circuit according to an embodiment of the disclosure. The data line gating circuit as shown in FIG. 4 includes multiple gating units 41, each of the gating units 41 includes multiple thin film transistor groups 42, and each of the thin film transistor groups 42 includes a first thin film transistor M1 and a second thin film transistor M2.

A first electrode of the first thin film transistor M1 and a first electrode of the second thin film transistor M2 are connected to a same data line 33. A gate of the first thin film transistor M1 and a gate of the second thin film transistor M2 are connected to a same clock signal line. A second electrode of the first thin film transistor M1 is connected to a common voltage signal line 44 for providing a common voltage signal com. A second electrode of the second thin film transistor M2 is connected to a touch display data signal line 43 for providing the display data signal and the touch detection data signal.

Different thin film transistor groups 42 in the same gating unit 41 are connected to different clock signal lines, and are connected to the same touch display data signal line. The first thin film transistor M1 and the second thin film transistor M2 in the same thin film transistor group 42 have different on-state voltages. The thin film transistor groups 42 in different gating units 41 are connected to different touch display data signal lines 43. All thin film transistor groups 42 are connected to the same common voltage signal line 44.

The clock signals for the thin film transistor groups 42 may be controlled. In the case that a certain first thin film transistor M1 is to be turned on, the common voltage signal line 44 may provide a corresponding data line 33 with the common voltage signal communication via the first thin film transistor M1. In the case that a certain second thin film transistor M2 is to be turned on, the touch display data signal line 43 may provide a corresponding data line 33 with the display data signal or the touch detection data signal via the second thin film transistor M2.

For the data line gating circuit according to an embodiment of the disclosure, the data lines 33 may be for transmitting the display data signal, the touch detection data signal or the common voltage signal. One touch display data signal line 43 is shared by multiple data lines, and one common voltage signal line 44 is shared by all data lines 33, thereby simplifying the wiring layout in the border area on the array substrate and reducing the number of data input terminals.

To ensure that the first thin film transistor M1 and the second thin film transistor M2 in the same thin film transistor groups 42 have different on-state voltages under the same clock signal, the first thin film transistor M1 may be a PMOS transistor and the second thin film transistor M2 may be an NMOS transistor. In other embodiments, the first thin film transistor M1 may be an NMOS transistor and the second thin film transistor M2 may be a PMOS transistor.

In the embodiment shown in FIG. 4, each of the gating units 41 includes a first thin film transistor group, a second thin film transistor group and a third thin film transistor group. The data lines include a first data line S1, a second data line S2 and a third data line S3. The first data line S1, the second data line S2 and the third data line S3 are electrically connected to a first color pixel unit, a second color pixel unit and a third color pixel unit, respectively.

A first electrode of the first thin film transistor M1 and a first electrode of the second thin film transistor M2 in the first thin film transistor group are electrically connected to the first data line S1, a first electrode of the first thin film transistor M1 and a first electrode of the second thin film transistor M2 in the second thin film transistor group are electrically connected to the second data line S2, and a first electrode of the first thin film transistor M1 and a first electrode of the second thin film transistor M2 in the third thin film transistor group are electrically connected to the third data line S3.

A gate of the first thin film transistor M1 and a gate of the second thin film transistor M2 in the first thin film transistor group are electrically connected to a first clock signal line for providing a first clock signal CK1. A gate of the first thin film transistor M1 and a gate of the second thin film transistor M2 in the second thin film transistor group are electrically connected to a second clock signal line for providing a second clock signal CK2. A gate of the first thin film transistor M1 and a gate of the second thin film transistor M2 in the third thin film transistor group are electrically connected to a third clock signal line for providing a third clock signal CK3.

In the embodiment shown in FIG. 4, three data lines correspond to the same touch display data signal line 43, and a display data signal or a touch detection data signal is provided for each of the three data lines 33 via the same touch display data signal line 43.

As shown in FIG. 4, the first thin film transistors M1 are PMOS transistors and the second thin film transistors M2 are NMOS transistors.

In the display stage, the second thin film transistors M2, which receives the second clock signal CK2, are turned on and the first thin film transistors M1 to which the second clock signal CK2 is input are turned off. In the case that the second clock signal CK2 is in a high level; the first clock signal CK1 and the third clock signal CK3 are in low levels, the first thin film transistors M1 to which the first clock signal CK1 or the third clock signal CK3 is input are turned on and the second thin film transistors M2 to which the first clock signal CK1 or the third clock signal CK3 is input are turned off, and the common voltage signal com is transmitted via the common voltage signal line 44, thus implementing a normal display.

In the touch stage, during a first period of time, the first clock signal CK1 is in a high level, the second thin film transistors M2 to which the first clock signal CK1 is input are turned on, and the touch detection data signal is input to the touch display data signal line 43 to perform a touch detection operation. During a second period of time, the second clock signal CK2 is in a high level, the second thin film transistors M2 to which the second clock signal CK2 is input are turned on, and the touch detection data signal is input to the touch display data signal line 43 to perform a touch detection operation. During a third period of time, the third clock signal CK3 is in a high level, the second thin film transistors M2 to which the third clock signal CK3 is input are turned on, and the touch detection data signal is input to the touch display data signal line 43 to perform a touch detection operation.

Figure 5:
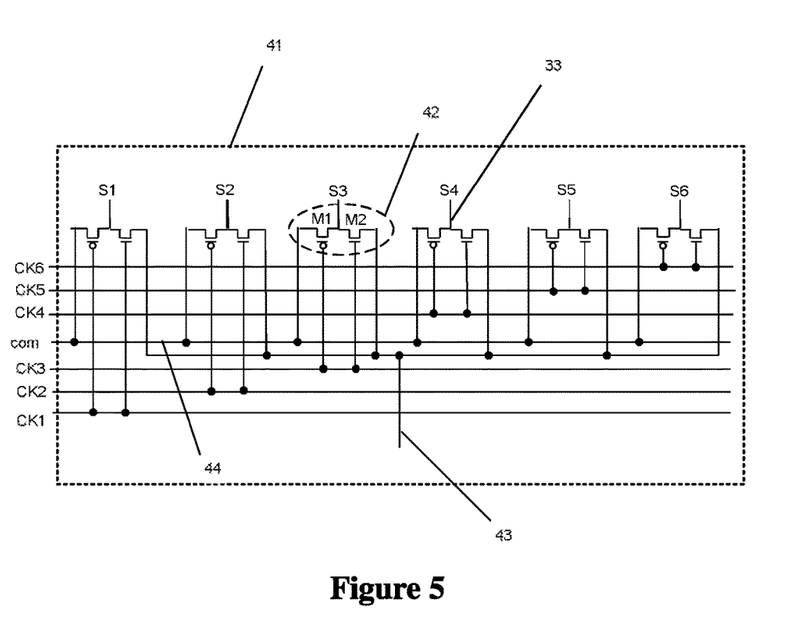
FIG. 5 is a schematic structural diagram of another data line gating circuit according to an embodiment of the disclosure.

Reference is now made to FIG. 5, which is a schematic structural diagram of another data line gating circuit according to an embodiment of the disclosure. Each gating unit 41 in the data line gating circuit as shown in FIG. 5 includes: a first thin film transistor group, a second thin film transistor group, a third thin film transistor group, a fourth thin film transistor group, a fifth thin film transistor group and a sixth thin film transistor group. That is, each gating unit 41 includes six thin film transistor groups 42. The data lines 33 include: a first data line S1 and a second data line S2 each connected to a first color pixel unit, a third data line S3 and a fourth data line S4 each connected to a second color pixel unit, and a fifth data line S5 and a sixth data line S6 each connected to a third color pixel unit. As shown in FIG. 5, the first thin film transistors M1 are PMOS transistors and the second thin film transistors M2 are NMOS transistors.

A first electrode of the first thin film transistor M1 and a first electrode of the second thin film transistor M2 in the first thin film transistor group are electrically connected to the first data line S1. A first electrode of the first thin film transistor M1 and a first electrode of the second thin film transistor M2 in the second thin film transistor group are electrically connected to the second data line S2. A first electrode of the first thin film transistor M1 and a first electrode of the second thin film transistor M2 in the third thin film transistor group are electrically connected to the third data line S3. A first electrode of the first thin film transistor M1 and a first electrode of the second thin film transistor M2 in the fourth thin film transistor group are electrically connected to the fourth data line S4. A first electrode of the first thin film transistor M1 and a first electrode of the second thin film transistor M2 in the fifth thin film transistor group are electrically connected to the fifth data line S5. A first electrode of the first thin film transistor M1 and a first electrode of the second thin film transistor M2 in the sixth thin film transistor group are electrically connected to the sixth data line S6.

A gate of the first thin film transistor Ml and a gate of the second thin film transistor M2 in the first thin film transistor group are electrically connected to a first clock signal line for providing a first clock signal CK1. A gate of the first thin film transistor M1 and a gate of the second thin film transistor M2 in the second thin film transistor group are electrically connected to a second clock signal line for providing a second clock signal CK2. A gate of the first thin film transistor M1 and a gate of the second thin film transistor M2 in the third thin film transistor group are electrically connected to a third clock signal line for providing a third clock signal CK3. A gate of the first thin film transistor M1 and a gate of the second thin film transistor M2 in the fourth thin film transistor group are electrically connected to a fourth clock signal line for providing a fourth clock signal CK4. A gate of the first thin film transistor M1 and a gate of the second thin film transistor M2 in the fifth thin film transistor group are electrically connected to a fifth clock signal line for providing a fifth clock signal CK5. A gate of the first thin film transistor M1 and a gate of the second thin film transistor M2 in the sixth thin film transistor group are electrically connected to a sixth clock signal line for providing a sixth clock signal CK6.

In the embodiment shown in FIG. 5, the six data lines correspond to the same touch display data signal line 43, and a display data signal or a touch detection data signal is provided for each of the six data lines 33 via the same touch display data signal line 43.

The array substrate according to the embodiments of the disclosure operates in an IPS (In-Plane Switching) driving mode, and the pixel electrodes and the common electrode layer are disposed on the substrate and are disposed on the same side of the substrate.

It can be seen from the above description that, for the array substrate according to the embodiments of the disclosure, the data lines double as the wires for the touch display electrodes, and the data lines can transmit the common voltage signal, the display data signal or the touch detection data signal. It is not necessary to deposit a metal layer separately for the touch display electrodes, thereby simplifying the fabrication process, reducing the fabrication cost, and reducing the thickness of the panel. By using the data line gating circuit, the wiring layout in the border area is simplified and the number of the data input terminals is reduced, which facilitates the drive control of the data lines.

Figure 6:
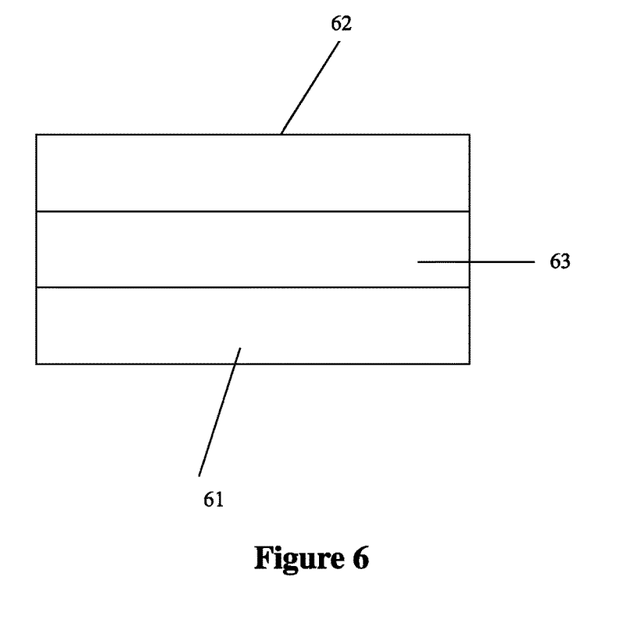
FIG. 6 is a schematic structural diagram of a self-capacitive touch display panel according to an embodiment of the disclosure.

A self-capacitive touch display panel is further provided according to an embodiment of the disclosure. Reference is made to FIG. 6, which is a schematic structural diagram of the self-capacitive touch display panel according to the embodiment of the disclosure. The self-capacitive touch display panel includes: an array substrate 61 and a color film substrate 62 disposed facing to the array substrate 61; a liquid crystal layer 63 disposed between the array substrate 61 and the color film substrate 62; and a driving chip (not shown in FIG. 6) disposed in a border area of the array substrate 61, where the driving chip is electrically connected to a data line gating circuit of the array substrate 61, to provide the data lines with a display data signal.

The self-capacitive touch display panel may be applied to electronic devices such as a mobile phone, a computer, a television, and the like. In the self-capacitive touch display panel according to an embodiment, the array substrate 61 is the array substrate according to the above embodiments. Therefore, the self-capacitive touch display panel has advantages of simple fabrication process, low cost, thin thickness, and simple wiring layout, and the number of terminals of the driving chip for connecting touch display data signal lines of the data line gating circuit is small.

A touch device is further provided according to an embodiment of the disclosure. The touch device includes the above self-capacitive touch display panel. The touch device may be electronic devices such as a mobile phone, a computer or a television.

The touch device has advantages of simple fabrication process, low cost, thin thickness, and simple wiring layout, and the number of terminals of the driving chip for connecting touch display data signal lines of the data line gating circuit is small.

The description of the embodiments disclosed herein enables those skilled in the art to implement or use the present disclosure. Numerous modifications to the embodiments are apparent to those skilled in the art, and the general principle herein can be implemented in other embodiments without deviation from the spirit or scope of the present disclosure. Therefore, the present disclosure is not limited to the embodiments described herein, but is in accordance with the widest scope consistent with the principle and novel features disclosed herein.

The invention claimed is:

1. An array substrate for a self-capacitive touch display panel, comprising:
    a substrate comprising a display area and a border area;
    a plurality of gate lines and a plurality of data lines, wherein the plurality of gate lines are insulated from and intersect with the plurality of data lines to define a plurality of pixel units arranged in an array, and each of the plurality of pixel units comprises:
        a pixel electrode; and
        a pixel thin film transistor, wherein a gate of the pixel thin film transistor is connected to one of the gate lines, a first electrode of the pixel thin film transistor is connected to one of the data lines, and a second electrode of the pixel thin film transistor is connected to the pixel electrode;
    a plurality of touch-driven thin film transistors, wherein the touch-driven thin film transistors are disposed in a same layer as the pixel thin film transistors, wherein a gate of each of the plurality of touch-driven thin film transistors is connected to one of the gate lines, and a first electrode of each of the touch-driven thin film transistors is connected to one of the data lines;
    a common electrode layer disposed in the display area, wherein the common electrode layer comprises a plurality of touch display electrodes insulated from each other, each of the touch display electrodes is electrically connected to second electrodes of at least two of the touch-driven thin film transistors connected to different gate lines, and the touch-driven thin film transistors and the pixel thin film transistors connected to the same gate line have different on-state voltages; and
    a data line gating circuit disposed in the border area, wherein the data line gating circuit via the data lines provide:
        the pixel electrodes with display data signals in a display stage;
        provide the touch display electrodes with common voltage signals in the display stage; and provide the touch display electrodes with touch detection data signals in a touch stage.

2. The array substrate according to claim 1, wherein the data line gating circuit comprises a plurality of gating units, and each of the gating units comprises a plurality of clock signal terminals, at least one output terminal, a first input terminal and a second input terminal,
    wherein each of the clock signal terminals is connected to one corresponding clock signal line, each of the at least one output terminal is correspondingly connected to one of the data lines; the first input terminal is connected to a touch display data signal line, where the touch display data signal line is for providing the display data signals and the touch detection data signals; and the second input terminal is connected to a common voltage signal line, where the common voltage signal line is for providing the common voltage signals.

3. The array substrate according to claim 2, wherein each of the gating units comprises a plurality of thin film transistor groups, and each of the thin film transistor groups comprises a first thin film transistor and a second thin film transistor,
    wherein a first electrode of the first thin film transistor and a first electrode of the second thin film transistor are connected to the same data line, a gate of the first thin film transistor and a gate of the second thin film transistor are connected to the same clock signal line, a second electrode of the first thin film transistor is connected to the second input terminal, and a second electrode of the second thin film transistor is connected to the first input terminal.

4. The array substrate according to claim 3, wherein different thin film transistor groups in the same gating unit are connected to different clock signal lines, and are connected to the same touch display data signal line; and different on-state voltages are provided for the first thin film transistor and the second thin film transistor in the same thin film transistor group.

5. The array substrate according to claim 4, wherein the thin film transistor groups in different gating units are connected to different touch display data signal lines, and all thin film transistor groups are connected to the same common voltage signal line.

6. The array substrate according to claim 5, wherein the first thin film transistors are PMOS transistors and the second thin film transistors are NMOS transistors; or
the first thin film transistors are NMOS transistors and the second thin film transistors are PMOS transistors.

7. The array substrate according to claim 5, wherein within the area of one touch display electrode, a part of the pixel units connected to the same data line with the touch-driven thin film transistors are located in the border area; or
within the area of one touch display electrode, at least a part of the pixel units connected to the same data line with the touch-driven thin film transistors are white pixel units.

8. The array substrate according to claim 5, wherein each of the gating units comprises a first thin film transistor group, a second thin film transistor group and a third thin film transistor group;
the data lines comprise a first data line, a second data line and a third data line, wherein the first data line, the second data line and the third data line are electrically connected to a first color pixel unit, a second color pixel unit and a third color pixel unit, respectively; and
a first electrode of the first thin film transistor and a first electrode of the second thin film transistor in the first thin film transistor group are electrically connected to the first data line, a first electrode of the first thin film transistor and a first electrode of the second thin film transistor in the second thin film transistor group are electrically connected to the second data line, and a first electrode of the first thin film transistor and a first electrode of the second thin film transistor in the third thin film transistor group are electrically connected to the third data line.

9. The array substrate according to claim 5, wherein each of the gating units comprises a first thin film transistor group, a second thin film transistor group, a third thin film transistor group, a fourth thin film transistor group, a fifth thin film transistor group and a sixth thin film transistor group;
the data lines comprise a first data line and a second data line each connected to a first color pixel unit, a third data line and a fourth data line each connected to a second color pixel unit, and the fifth data line and the sixth data line each connected to a third color pixel unit; and
a first electrode of the first thin film transistor and a first electrode of the second thin film transistor in the first thin film transistor group are electrically connected to the first data line, a first electrode of the first thin film transistor and a first electrode of the second thin film transistor in the second thin film transistor group are electrically connected to the second data line, a first electrode of the first thin film transistor and a first electrode of the second thin film transistor in the third thin film transistor group are electrically connected to the third data line, a first electrode of the first thin film transistor and a first electrode of the second thin film transistor in the fourth thin film transistor group are electrically connected to the fourth data line, a first electrode of the first thin film transistor and a first electrode of the second thin film transistor in the fifth thin film transistor group are electrically connected to the fifth data line, and a first electrode of the first thin film transistor and a first electrode of the second thin film transistor in the sixth thin film transistor group are electrically connected to the sixth data line.

10. The array substrate according to claim 1, wherein the pixel thin film transistors are PMOS transistors and the touch-driven thin film transistors are NMOS transistors; or
the pixel thin film transistors are NMOS transistors and the touch-driven thin film transistors are PMOS transistors.

11. The array substrate according to claim 1, wherein the common electrode layer is disposed between the pixel electrodes and the substrate; or
the pixel electrodes are disposed between the common electrode layer and the substrate.

12. The array substrate according to claim 1, wherein the touch-driven thin film transistors and the pixel thin film transistors connected to the same data line are disposed on two sides of the data line respectively.

13. The array substrate according to claim 1, wherein the second electrodes of the touch-driven thin film transistors connected to the same data line are electrically connected to the same touch display electrode.

14. A self-capacitive touch display panel, comprising:
an array substrate and a color film substrate opposite to the array substrate, wherein the array substrate comprises:
a substrate comprising a display area and a border area;
a plurality of gate lines and a plurality of data lines, wherein the plurality of gate lines are insulated from and intersect with the plurality of data lines to define a plurality of pixel units arranged in an array, and each of the plurality of pixel units comprises:
a pixel electrode; and
a pixel thin film transistor, wherein a gate of the pixel thin film transistor is connected to one of the gate lines, a first electrode of the pixel thin film transistor is connected to one of the data lines, and a second electrode of the pixel thin film transistor is connected to the pixel electrode;
a plurality of touch-driven thin film transistors, wherein the touch-driven thin film transistors are disposed in a same layer as the pixel thin film transistors, wherein a gate of each of the plurality of touch-driven thin film transistors is connected to one of the gate lines, and a first electrode of each of the touch-driven thin film transistors is connected to one of the data lines;
a common electrode layer disposed in the display area, wherein the common electrode layer comprises a plurality of touch display electrodes insulated from each other, each of the touch display electrodes is electrically connected to second electrodes of at least two of the touch-driven thin film transistors connected to different gate lines, and the touch-driven thin film transistors and the pixel thin film transistors connected to the same gate line have different on-state voltages; and
a data line gating circuit disposed in the border area, wherein the data line gating circuit via the data lines provide the pixel electrodes with display data signals in a display stage, provide the touch display electrodes with common voltage signals in the display stage, and provide the touch display electrodes with touch detection data signals in a touch stage;

a liquid crystal layer disposed between the array substrate and the color film substrate; and a driving chip disposed in the border area on the array substrate, wherein the driving chip is electrically connected to the data line gating circuit of the array substrate.

15. A touch device comprising a self-capacitive touch display panel, wherein the self-capacitive touch display panel comprises:

an array substrate and a color film substrate opposite to the array substrate, wherein the array substrate comprises:

a substrate comprising a display area and a border area;

a plurality of gate lines and a plurality of data lines, wherein the plurality of gate lines are insulated from and intersect with the plurality of data lines to define a plurality of pixel units arranged in an array, and each of the plurality of pixel units comprises:

a pixel electrode; and a pixel thin film transistor, wherein a gate of the pixel thin film transistor is connected to one of the gate lines, a first electrode of the pixel thin film transistor is connected to one of the data lines, and a second electrode of the pixel thin film transistor is connected to the pixel electrode;

a plurality of touch-driven thin film transistors, wherein the touch-driven thin film transistors are disposed in a same layer as the pixel thin film transistors, wherein a gate of each of the plurality of touch-driven thin film transistors is connected to one of the gate lines, and a first electrode of each of the touch-driven thin film transistors is connected to one of the data lines;

a common electrode layer disposed in the display area, wherein the common electrode layer comprises a plurality of touch display electrodes insulated from each other, each of the touch display electrodes is electrically connected to second electrodes of at least two of the touch-driven thin film transistors connected to different gate lines, and the touch-driven thin film transistors and the pixel thin film transistors connected to the same gate line have different on-state voltages; and a data line gating circuit disposed in the border area, wherein the data line gating circuit via the data lines provide the pixel electrodes with display data signals in a display stage, provide the touch display electrodes with common voltage signals in the display stage, and provide the touch display electrodes with touch detection data signals in a touch stage;

a liquid crystal layer disposed between the array substrate and the color film substrate; and a driving chip disposed in the border area on the array substrate, wherein the driving chip is electrically connected to the data line gating circuit of the array substrate.

* * * * *